United States Patent
Park et al.

(10) Patent No.: US 10,290,117 B2
(45) Date of Patent: May 14, 2019

(54) SYSTEM FOR EXTRACTING POSITION INFORMATION OF OBJECT IN POINT CLOUD DATA BY USING COMPONENT

(71) Applicants: Korea Expressway Corporation, Gyeongsangbuk-do (KR); ITS KOREA, Gyeonggi-do (KR)

(72) Inventors: Jae Hyung Park, Chungcheongnam-do (KR); Sung Hwan Kim, Seoul (KR); Seung Hwan Lee, Gyeonggi-do (KR); Yu Kyung Park, Gyeonggi-do (KR); Byung Ju Kim, Gyeonggi-do (KR)

(73) Assignees: Korea Expressway Corporation, Gyeongsangbuk-do (KR); ITS KOREA, Gyeonggi-do (KR)

( * ) Notice: Subject to any disclaimer, the term of this patent is extended or adjusted under 35 U.S.C. 154(b) by 8 days.

(21) Appl. No.: 15/661,284

(22) Filed: Jul. 27, 2017

(65) Prior Publication Data
US 2018/0374238 A1 Dec. 27, 2018

(30) Foreign Application Priority Data
Jun. 26, 2017 (KR) .......................... 10-2017-0080480

(51) Int. Cl.
| | | |
|---|---|---|
| G06T 7/00 | (2017.01) | |
| G06T 7/73 | (2017.01) | |
| G06T 7/12 | (2017.01) | |
| G06T 3/00 | (2006.01) | |
| G06T 7/66 | (2017.01) | |
| G01S 17/89 | (2006.01) | |

(52) U.S. Cl.
CPC .............. *G06T 7/75* (2017.01); *G06T 3/0081* (2013.01); *G06T 7/12* (2017.01); *G06T 7/66* (2017.01); *G01S 17/89* (2013.01); *G06T 2207/10028* (2013.01)

(58) Field of Classification Search
None
See application file for complete search history.

(56) References Cited

U.S. PATENT DOCUMENTS

2012/0256916 A1* 10/2012 Kitamura ............... G01B 11/24
345/419
2017/0294026 A1* 10/2017 Choi ....................... G01S 17/42

FOREIGN PATENT DOCUMENTS

| KR | 10-0995400 | 11/2010 |
| KR | 10-1427364 | 8/2014 |

* cited by examiner

*Primary Examiner* — Delomia L Gilliard

(57) ABSTRACT

The present invention relates to a system for extracting position information of object in point cloud data by using component comprising a component file creating unit making the component file of prior standardized object; an object position information extraction unit extracting position information of object by using point cloud data collected by LiDAR; and an object outline extraction and position determination unit optimizing object outline of point cloud data by using the component file, and extracting accurate information of standard position from the optimized outline.

8 Claims, 9 Drawing Sheets

< Prior Art > a. Shape of caution sign b. Shape of regulation sign c. Shape of instruction sign d. Shape of assistant sign $$c_x = \frac{1}{6A} \sum_{i=0}^{N-1} (x_i + x_{i+1})(x_i y_{i+1} - x_{i+1} y_i)$$

$$c_y = \frac{1}{6A} \sum_{i=0}^{N-1} (y_i + y_{i+1})(x_i y_{i+1} - x_{i+1} y_i)$$

SYSTEM FOR EXTRACTING POSITION INFORMATION OF OBJECT IN POINT CLOUD DATA BY USING COMPONENT

CROSS-REFERENCE TO RELATED APPLICATION

This application claims priority of Korean Patent Application No. 10-2017-0080480, filed on Jun. 26, 2017, in the KIPO (Korean Intellectual Property Office), the disclosure of which is incorporated herein entirely by reference.

BACKGROUND OF THE INVENTION

Field of the Invention

The present invention relates to a system for extracting position information of object in point cloud data by using component, and more particularly, to a system for extracting position information of object in point cloud data by using component, which can determine an outline by using a modeling for each object according to accurate numerical value and proportion of standardized object, and extract accurate position information with the position information of object.

Description of the Related Art

Recently, surveying technique advances in aspects of speed and accuracy of acquiring local data for making a map rapidly. Accurate data can be rapidly processed for area whenever and wherever the automobile can enter and run by appearance of MMS (Mobile Mapping System) mounting various data acquisition and position determination apparatus such as LiDAR (Light Detection Ranging, a device measuring the distance from object by using laser ray), camera, GPS/INS, and etc.

A practical use for map also is arising with those developments of techniques. A prior map played a role of understanding of present condition and use for construction work. However, a recent map is widening the usability into various fields as fast and accurate mapping techniques appear. Particularly, concern of the map is arising because it is anticipated that the map will supplement sensors of autonomous vehicle to help safe driving of the autonomous vehicle.

Recent mapping techniques use MMS comprising LiDAR sensor, GPS/INS and etc. to use mapping by acquiring point cloud data for map database construction rapidly and accurately.

Prior arts of a method for making 3D interior map by using LiDAR data (Korean Patent Registration No. 10-1427364), and a method of extracting outline of building (Korean Patent Registration No. 10-0995400) are disclosed.

The final map data manufacturing must go through the process using the point cloud data to map. These processes have low accuracy because there is no clear standard in point cloud data to determine the standard position by visual identification of worker, and have low economic efficiency because considerable time and manpower are necessary in order to enhance the accuracy. Therefore, methods to solve those problems are needed.

SUMMARY OF THE INVENTION

The present invention relates to a system for extracting position information of object in point cloud data by using component, comprising a component file creating unit making the component file of prior standardized object; an object position information extraction unit extracting position information of object by using point cloud data collected by LiDAR; and an object outline extraction and position determination unit optimizing object outline of point cloud data by using the component file, and extracting accurate information of standard position from the optimized outline.

In another aspect, the component file creating unit further comprises a road object information collection unit defining shape for prior standardized object which stands for road facilities and its appendages defined in Vienna Convention or MUTCD (Manual on Uniform Traffic Control Device), and collecting information of the shape; a component file manufacturing unit making the component file on the basis of the collected information; a component standard position designation unit designating geometric standard position of the manufactured component file; and an offset value setup unit setting coordinates extraction offset value in order to eliminate errors arising from depth of component file.

In another aspect, the object position information extraction unit further comprises an object projection unit making orthoimage for the object to be extracted in point cloud data in order to appear the object in point cloud data in the front; a component input unit adjusting the component file manufactured in real size with the scale of screen equally to match up with point cloud data each other without extra adjustment of size; a snap unit matching specific points such as edge in component with the desired points in point cloud data to enhance matching accuracy; and a standard position creating unit reading accurate coordinates for the designated position from matched component file and point cloud data to create points.

In another aspect, the object outline extraction and position determination unit further comprises an object outline extraction unit extracting outline of the object by filtering method; an optimized object file determination unit determining the most proper component file in component file data on the basis of extracted outline; an object outline optimization unit using the determined component file to optimize the outline of point cloud data; and a standard position determination unit calculating a center of gravity of polygon to determine the position in order to determine the standard position from optimized outline.

The present invention is to provide a system for extracting position information of object in point cloud data by using component which enables to decrease time and manpower required in position determination and determine accurate position information within short period by using the method providing a component file with the object of which a shape is regulated among the objects to be extracted to map each other.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

Figure 1:
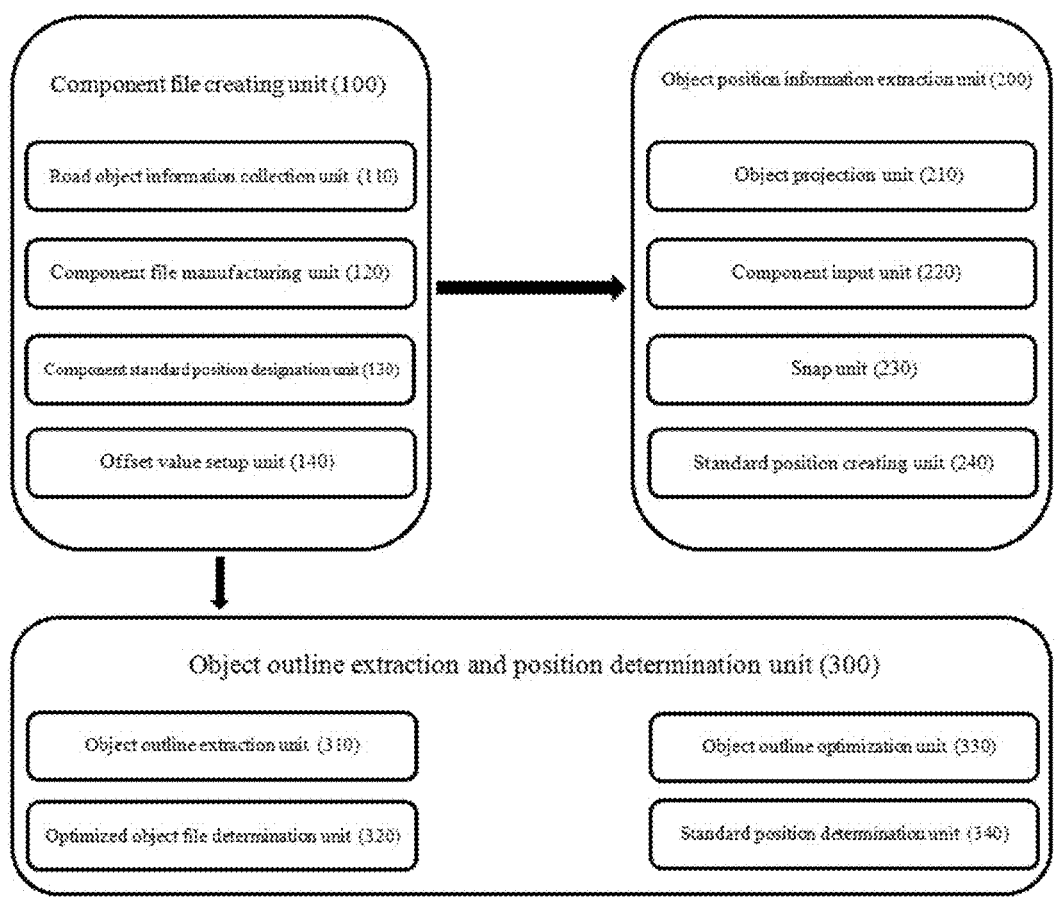
FIG. 1 is a block diagram schematically showing a composition of object position information extraction system of point cloud data using component according to an embodiment of the present invention.
Figure 2:
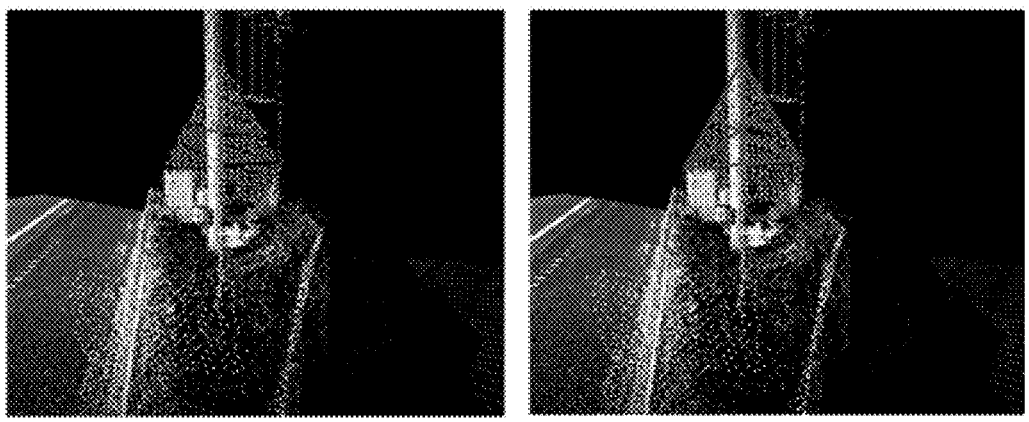
FIG. 2 is a picture showing a method of object position extraction according to the prior art.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Hereinafter, a system for extracting position information of object in point cloud data by using component according to the embodiments of the present invention will be explained in detail by referring to the FIGS. 1 to 13.

As shown in FIG. 1, a system for extracting position information of object in point cloud data by using component according to the embodiments of the present invention composes a component file creating unit 100, an object position information extraction unit 200, and an object outline extraction and position determination unit 300. The component file creating unit 100 plays a role of making the component file of prior standardized object, an object position information extraction unit 200 plays a role of extracting position information of object by using point cloud data collected by LiDAR, and an object outline extraction and position determination unit 300 plays a role of optimizing object outline of point cloud data by using the component file and extracting accurate information of standard position from the optimized outline.

The component file creating unit 100 comprises a road object information collection unit 110 defining shape for prior standardized object which stands for road facilities and its appendages defined in Vienna Convention or MUTCD (Manual on Uniform Traffic Control Device) and collecting information of the shape, a component file manufacturing unit 120 making the component file on the basis of the collected information, a component standard position designation unit 130 designating geometric standard position of the manufactured component file, and an offset value setup unit 140 setting coordinates extraction offset value in order to eliminate errors arising from depth of component file.

Figure 3:
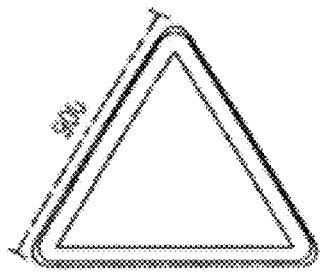
FIG. 3 is an illustration of road signal applying to object extraction in the present invention.
Figure 3:
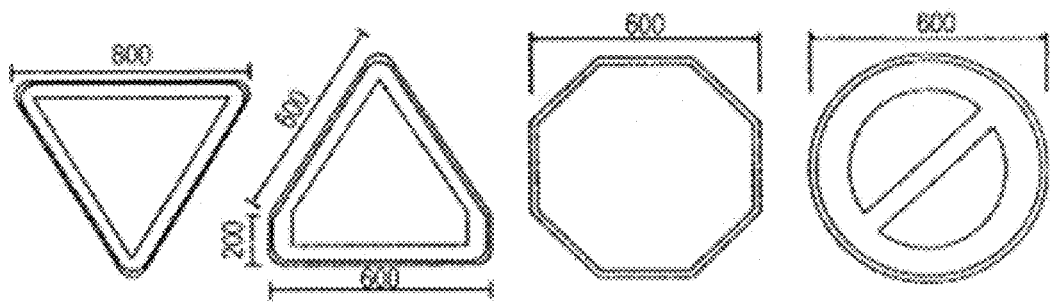
Figure 3:
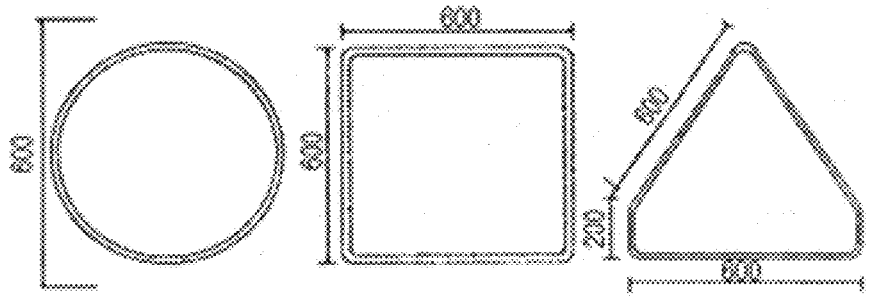
Figure 3:
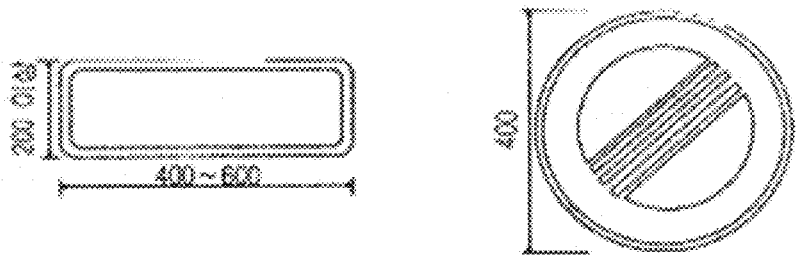

The road object information collection unit 110 defines a shape of road signal to be extracted by point cloud data as shown in FIG. 3.

The component file manufacturing unit 120 models the shape of FIG. 3 to make a component file, and enables to match a shape of three-dimensional model with an object point cloud data in space by applying geometric X, Y, and Z to designate height, width and depth of the facilities.

The component standard position designation unit 130 calculates a standard position of component file to designate geometric standard position of each object by using a standard height (X-axis) and width (Y-axis).

Figure 4:
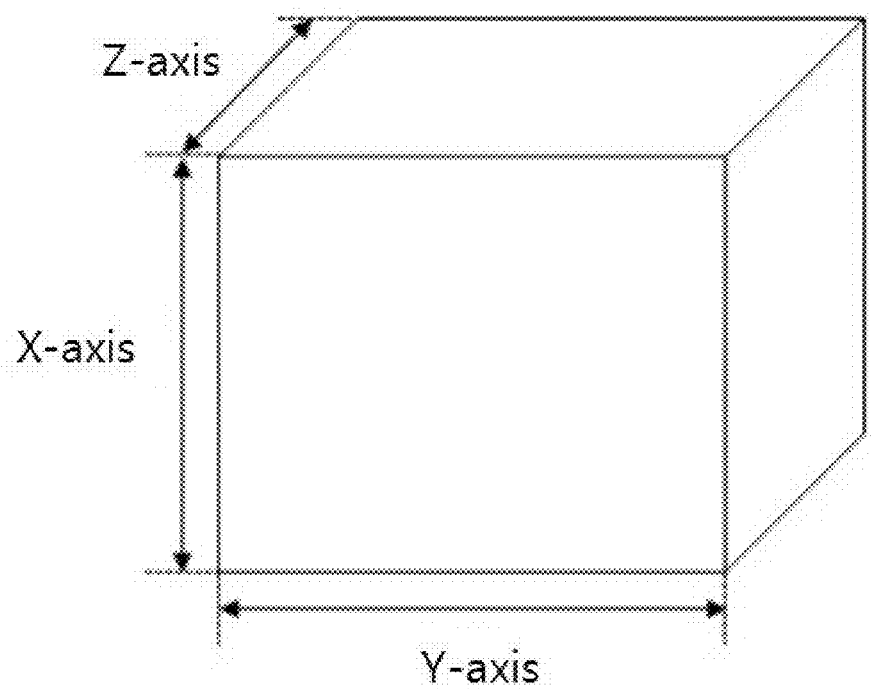
FIG. 4 is a conceptual diagram of standard coordinates for standard position calculation.
Figure 5:
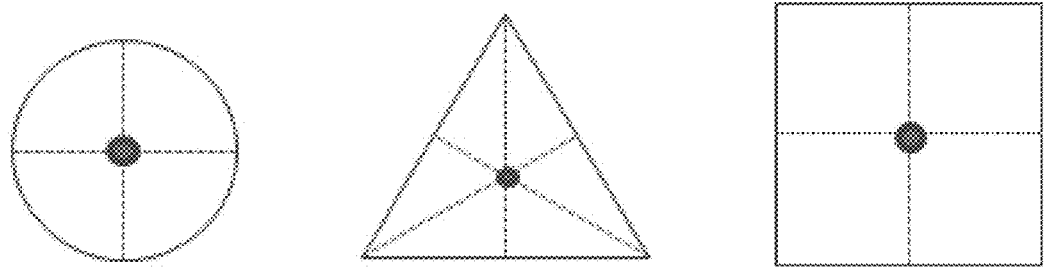
FIG. 5 is a conceptual diagram of standard coordinates for standard position calculation.

The offset value setup unit 140 works as an error factor when matching point cloud data with component file to designate position because of a depth (Z-axis) of component file as shown in FIG. 4. Therefore, it is preferable to eliminate an error for depth of an object by defining those in advance.

The object position information extraction unit 200 comprises an object projection unit 210 making orthoimage for the object to be extracted in point cloud data in order to appear the object in point cloud data in the front, a component input unit 220 adjusting the component file manufactured in real size with the scale of screen equally to matching up with point cloud data each other without extra adjustment of size, a snap unit 230 matching specific points such as edge in component with the desired points in point cloud data to enhance matching accuracy, and a standard position creating unit 240 reading accurate coordinates for the designated position from matched component file and point cloud data to create points.

The object projection unit 210 makes a shape of three-dimensional facility in screen to appear as a real size and shape in the front, and makes a cube to appear in screen to coincide the front position of a facility with standard cube in screen for the adjustment in screen The component input unit 220 outputs the component manufactured in the component file creating unit 100 into screen, and makes the component file with real size into the scale of screen equally to adjust the same size of the component file as that of screen.

The snap unit 230 is to match a position of point cloud data with that of component file, and is characterized in applying object snap function in order to arrange the component to the specific position of point cloud data regularly.

The standard position creating unit 240 is characterized in creating a point in the center position of the component with excluding a standard position of component and coordinates extraction offset value to acquire accurate information of the position.

The object position information extraction unit 200 plays a role of applying the component manufactured in the component file creating unit 100 to extract standard position.

Figure 6:
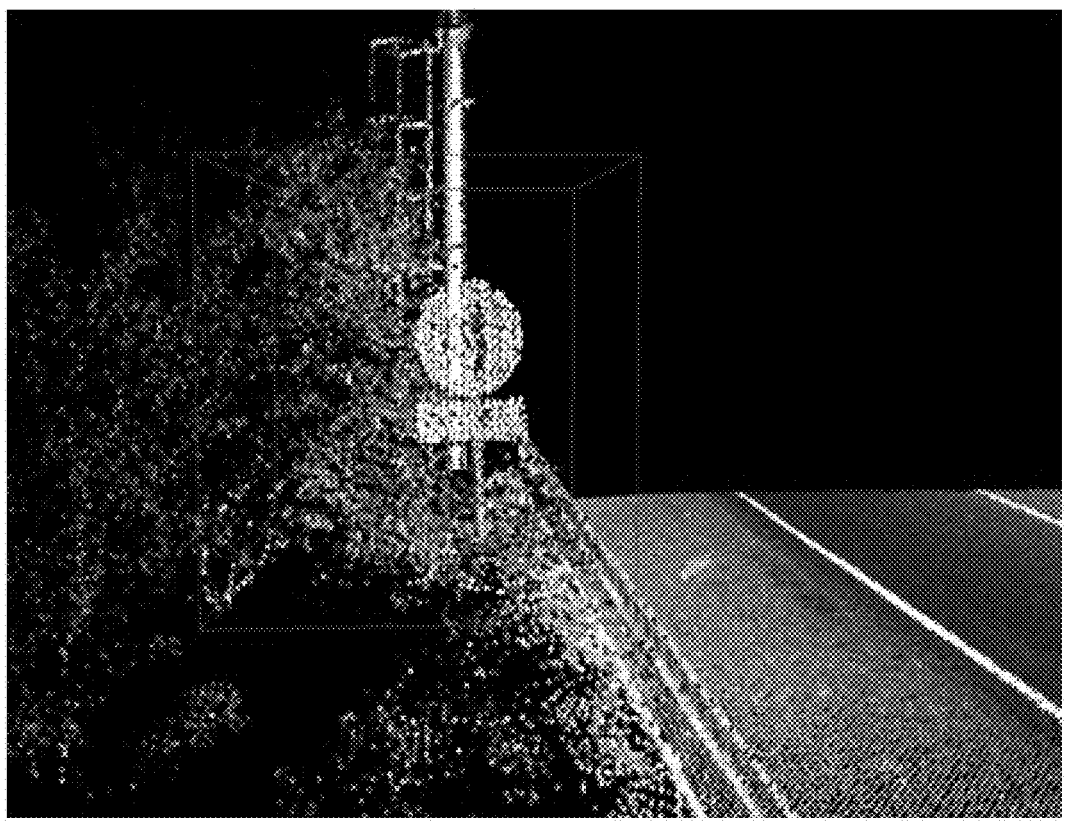
FIG. 6 is a conceptual diagram matching a direction of the facilities in the point cloud data with screen according to the present invention.

The first procedure for the position matching is to make orthoimage for the object to be extracted in point cloud data in order to appear the object in point cloud data in the front, and apply virtual cube such as FIG. 6 by the Object projection unit 210 to coincide the facilities in screen with input component.

The component input unit 220 adjusts the component file manufactured in real size with the scale of screen equally to matching up with point cloud data each other without extra adjustment of size.

Figure 7:
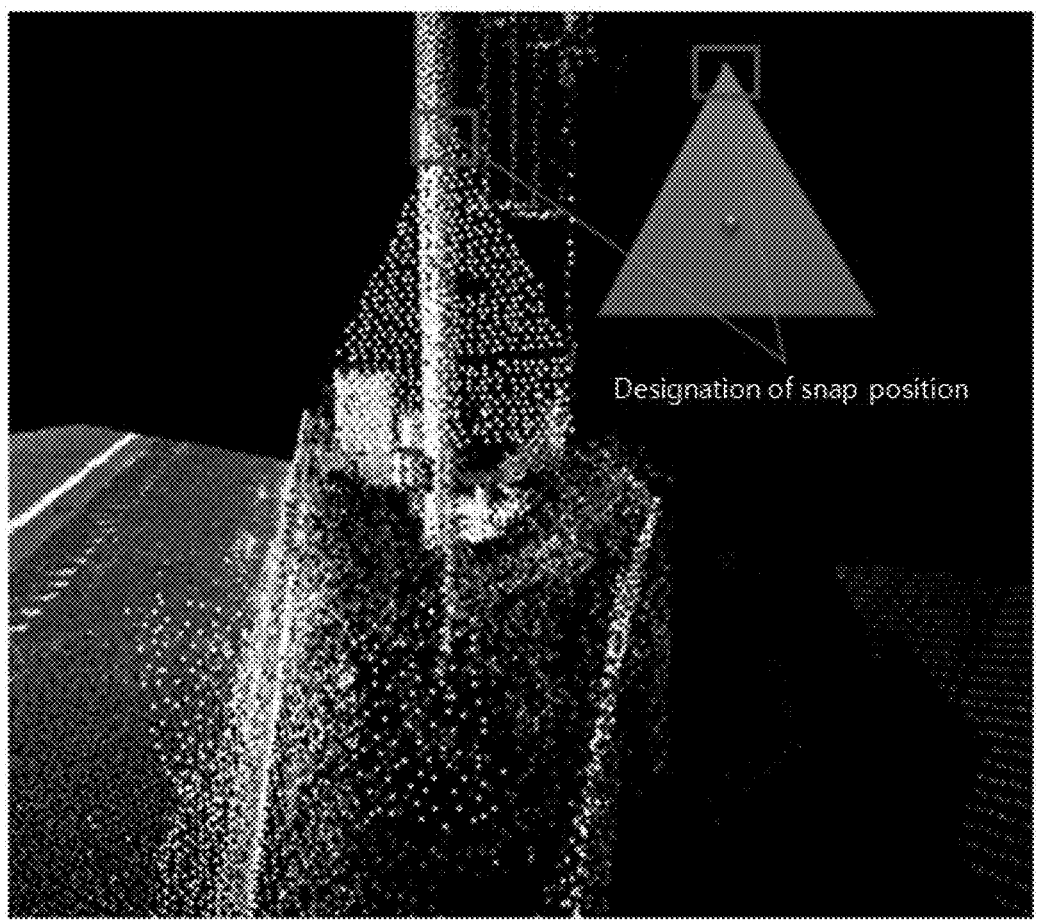
FIG. 7 is a conceptual diagram showing for matching a specific point of point cloud data with the facilities component according to the present invention.

As shown in FIG. 7, the snap unit 230 enhances matching accuracy by matching specific points such as edge in component with the desired points in point cloud data.

Figure 8:
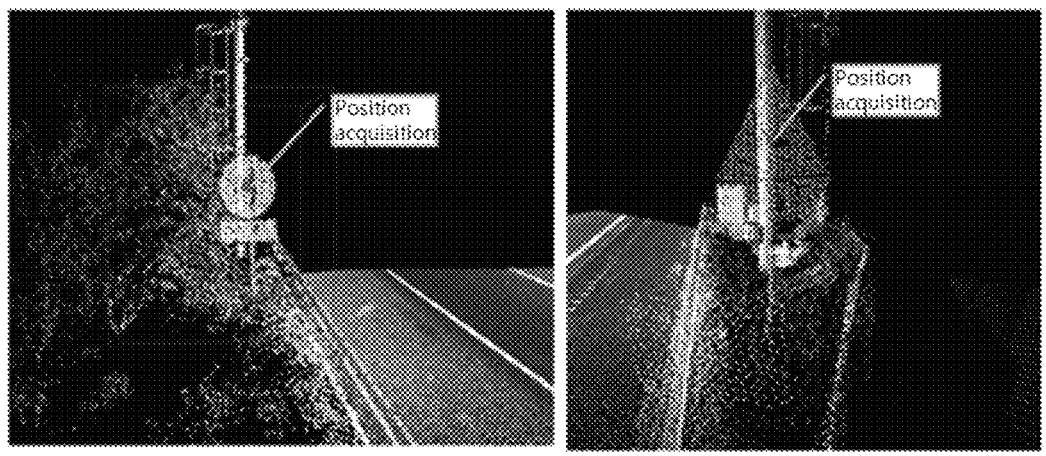
FIG. 8 is a conceptual diagram for the coordinates acquisition using the facilities fitting method.

The standard position creating unit 240 is to read accurate coordinates for the designated position such as FIG. 8 from matched component file and point cloud data to create points, and can enhance working speed as well as accuracy in comparison with the prior object position extraction method.

The object outline extraction and position determination unit 300 comprises an object outline extraction unit 310 extracting outline of the object by filtering method, an optimized object file determination unit 320 determining the most proper component file in component file data on the basis of extracted outline, an object outline optimization unit 330 using the determined component file to optimize the outline of point cloud data, and a standard position determination unit 340 calculating a center of gravity of polygon to determine the position in order to determine the standard position from optimized outline.

The object outline extraction unit 310 is characterized in filtering data of an object and its surroundings by applying attribute value (intensity data) of original data as a method for extracting outline of the object such as road facilities to extract outline of the object.

The optimized object file determination unit 320 is characterized in determining the component file in which a size and shape extracted in the object outline extraction unit 310 are the most proper from component file data created in the component file creating unit 100.

The object outline optimization unit 330 is to optimize the outline of point cloud data by using the component file determined by the optimized object file determination unit 320, and makes the same shape of outline as real shape though outline extracted from the object outline extraction unit 310 has rough line because of characteristics of point cloud data.

The standard position determination unit 340 extracts a geometric center from the polygon formed by the object outline optimization unit 330 to determine standard position.

Figure 9:
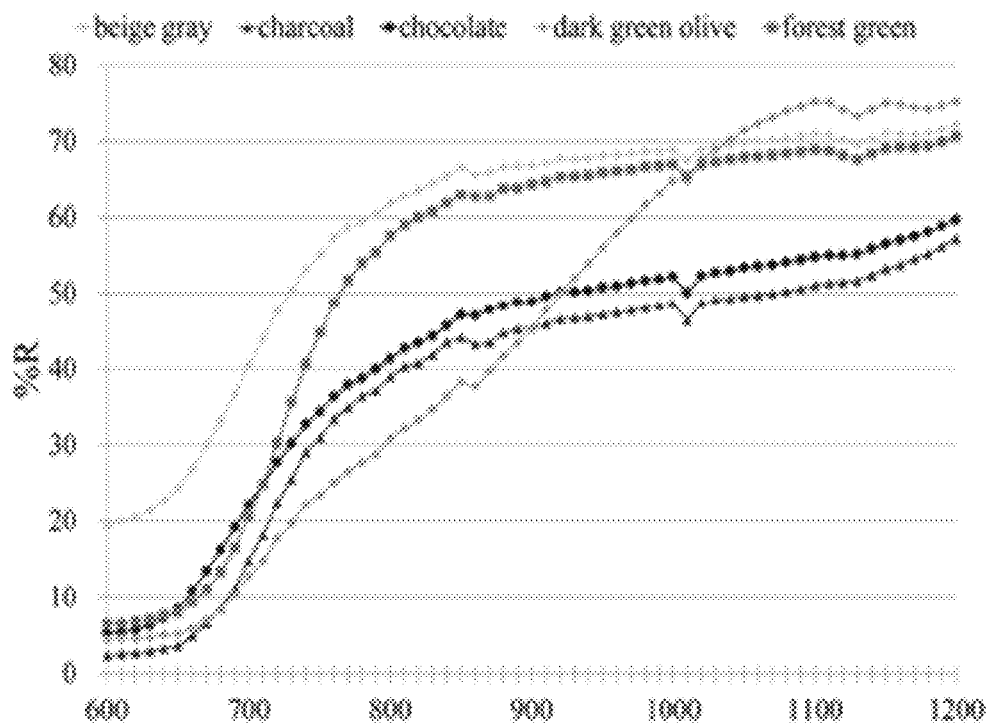
FIG. 9 is a graph showing the difference of reflectivity per specific wavelength range by applying to filtering of point cloud data.
Figure 10:
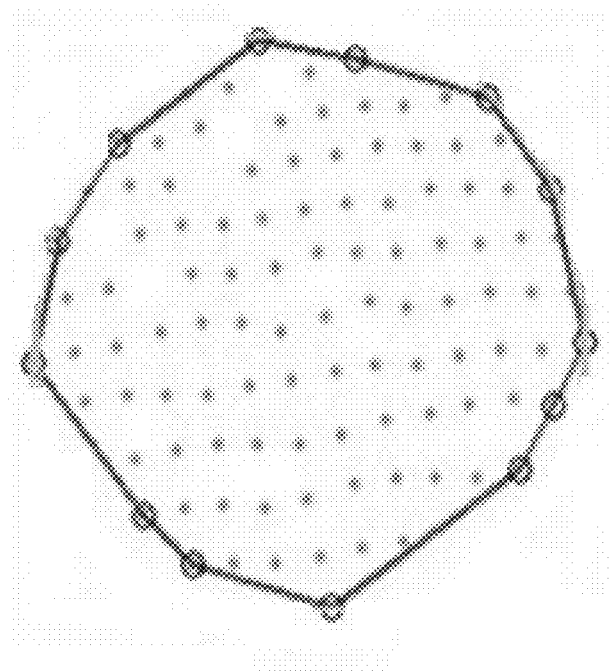
FIG. 10 is a diagram extracting outline of point cloud data.

The object outline extraction unit 310 applies reflectivity of the different object per specific wavelength range according to color and medium such as FIG. 9 in order to extract outline of object such as road facility, and filters data of object and its surroundings to extract outline of the object such as FIG. 10.

Figure 11:
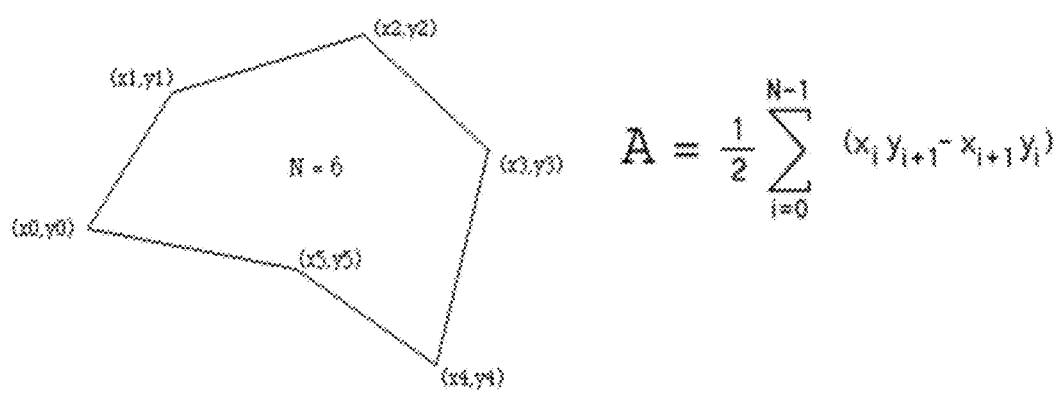
FIG. 11 is an exemplary diagram and formula calculating area of closed loop traverse.

The optimized object file determination unit 320 plays a role of determining the most proper component file among component file data in standard with the extracted outline such as FIG. 10, and calculates area for the outline extracted into the closed loop traverse by using the formula of FIG. 11 to determine the most proper component file on the basis of those results.

Figure 12:
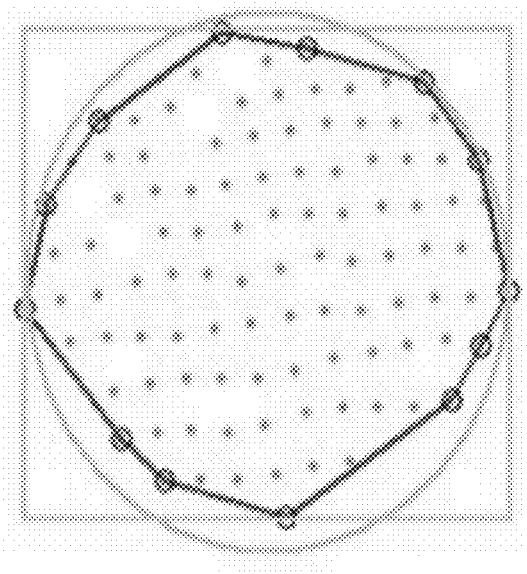
FIG. 12 is a diagram determining optimized outline by using closed loop traverse and component file.

The object outline optimization unit 330 is to optimize the outline of point cloud data by using the component file determined by the optimized object file determination unit 320, and adjust outline similar with shape and size of the chosen component such as an orange line of FIG. 12 because the outline extracted from object outline extraction unit 310 does not match with real shape by characteristics of point cloud data.

Figure 13:
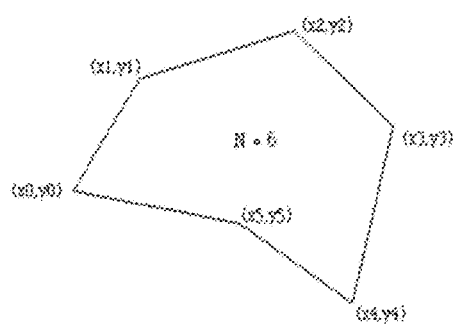
FIG. 13 is a diagram and formula calculating center of gravity of the closed loop traverse.

The standard position determination unit 340 is to determine standard position from the outline having the closed loop traverse, and calculate center of gravity of polygon such as FIG. 13 because the standard position uses a center position in general.

Although the preferred embodiments of the present invention have been disclosed for illustrative purposes, those skilled in the art will appreciate that various modifications are possible, without departing from the scope and spirit of the invention. Therefore, the scope of the present invention should not be restricted in the explained embodiments, and should be determined by all modifications or changes derived from the range of claims and its equivalent concept.

The present invention is advantageous in that it provides a system for extracting position information of object in point cloud data by using component, which enables to determine prompt and accurate position for the mapping object, create a point, and apply the accurate map data to various industrial fields.

Also, objects such as road facilities according to the present invention can easily be applied in the countries joining in the Vienna Convention or MUTCD (Manual on Uniform Traffic Control Device) and the other countries by applying separate database to use as a map on the basis of automatic driving of autonomous vehicle.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A system for extracting position information of object in point cloud data by using component, the system comprising:
    a component file creating unit making the component file of prior standardized object;
    an object position information extraction unit extracting position information of object by using point cloud data collected by LiDAR; and
    an object outline extraction and position determination unit matching object outline of point cloud data by using the component file, and extracting information of reference position from the matched outline;
    wherein the object position information extraction unit comprising:
        an object projection unit making orthoimage for the object to be extracted in point cloud data in order to make the object in point cloud data appear in the front direction;
        a component input unit adjusting the component file manufactured in actual size with the scale of screen equally to match up with point cloud data each other;
        a snap unit matching up specific points such as edge in component with the desired points in point cloud data to enhance matching accuracy; and
        a reference position creating unit reading coordinates for the designated position from matched component file and point cloud data to create points.

2. The system of claim 1, wherein the component file creating unit comprising:
    a road object information collection unit defining shape for prior standardized object which stands for road facilities and its appendages defined in Vienna Convention or MUTCD (Manual on Uniform Traffic Control Device), and collecting information of the shape;
    a component file manufacturing unit making the component file on the basis of the collected information;
    a component standard position designation unit designating geometric standard position of the manufactured component file; and
    an offset value setup unit setting coordinates extraction offset value in order to eliminate errors arising from depth of component file.

3. A system for extracting position information of object in point cloud data by using component, the system comprising:
    a component file creating unit making the component file of prior standardized object;
    an object position information extraction unit extracting position information of object by using point cloud data collected by LiDAR; and
    an object outline extraction and position determination unit matching object outline of point cloud data by using the component file, and extracting information of reference position from the matched outline,
    wherein the object outline extraction and position determination unit comprising:
        an object outline extraction unit extracting outline of the object by filtering method;
        a matched object file determination unit determining the most matching component file in component file data on the basis of extracted outline;
        an object outline matching unit using the determined component file to match the outline of point cloud data; and
        a reference position determination unit calculating a center of gravity of polygon to determine the position in order to determine the reference position from matched outline.

4. The system of claim 2, wherein the component file manufacturing unit enables to match a shape of three-dimensional model with an object point cloud data in space by applying geometric X, Y, and Z to designate height, width and depth of facilities.

5. The system of claim 2, wherein the component standard position designation unit calculates a standard position of component file to designate geometric standard position of each object by using a standard height (X-axis) and width (Y-axis).

6. The system of claim 3, wherein the component file creating unit comprising:
    a road object information collection unit defining shape for prior standardized object which stands for road facilities and its appendages defined in Vienna Convention or MUTCD (Manual on Uniform Traffic Control Device), and collecting information of the shape;
    a component file manufacturing unit making the component file on the basis of the collected information;
    a component standard position designation unit designating geometric standard position of the manufactured component file; and
    an offset value setup unit setting coordinates extraction offset value in order to eliminate errors arising from depth of component file.

7. The system of claim 6, wherein the component file manufacturing unit enables to match a shape of three-dimensional model with an object point cloud data in space by applying geometric X, Y, and Z to designate height, width and depth of facilities.

8. The system of claim 6, wherein the component standard position designation unit calculates a standard position of component file to designate geometric standard position of each object by using a standard height (X-axis) and width (Y-axis).

* * * * *